US007627904B2

United States Patent
Tokkonen

(10) Patent No.: US 7,627,904 B2
(45) Date of Patent: *Dec. 1, 2009

(54) METHOD AND ARRANGEMENT FOR CONTROLLING LOCKING FUNCTION

(75) Inventor: Timo Tokkonen, Oulu (FI)

(73) Assignee: Nokia Corporation, Espoo (FI)

( * ) Notice: Subject to any disclaimer, the term of this patent is extended or adjusted under 35 U.S.C. 154(b) by 669 days.

This patent is subject to a terminal disclaimer.

(21) Appl. No.: 10/673,526

(22) Filed: Sep. 29, 2003

(65) Prior Publication Data

US 2004/0088568 A1     May 6, 2004

(30) Foreign Application Priority Data

Sep. 30, 2002    (FI) .................................. 20021736

(51) Int. Cl.
     G06F 7/04      (2006.01)
(52) U.S. Cl. .............................. 726/27; 726/28; 726/29; 713/184; 705/43
(58) Field of Classification Search ........................ None
See application file for complete search history.

(56) References Cited

U.S. PATENT DOCUMENTS

| | | | | |
|---|---|---|---|---|
| 6,209,104 | B1 * | 3/2001 | Jalili | ............................ 726/18 |
| 6,353,449 | B1 | 3/2002 | Gregg et al. | |
| 6,720,860 | B1 * | 4/2004 | Narayanaswami | ......... 340/5.54 |
| 2002/0029341 | A1 | 3/2002 | Juels et al. | |
| 2004/0010721 | A1 * | 1/2004 | Kirovski et al. | ............. 713/202 |

OTHER PUBLICATIONS

Juels, Ari, and Sudan, Madhu; "A Fuzzy Vault Scheme", Proceedings of the 2002 IEEE International Symposium on Information Theory, Lausanne, Switzerland, #0 Jun.-Jul. 5, 2002, p. 408.

* cited by examiner

*Primary Examiner*—Pramila Parthasarathy
(74) *Attorney, Agent, or Firm*—Hollingsworth & Funk, LLC

(57) ABSTRACT

The invention relates to a method of controlling a locking function in a locking arrangement. The method presented comprises creating (300) a database from predetermined objects; determining (302) at least one user-specific inter-object internal order in the database; detecting (304) a control command for starting the control of the locking function; displaying (306) a predetermined number of objects on the display of the locking arrangement once the control command is detected; detecting (308) the selection order of the objects; and changing (316) the lock state when the detected object selection order is at least sufficiently close to a given user-specific inter-object internal order.

25 Claims, 3 Drawing Sheets

METHOD AND ARRANGEMENT FOR CONTROLLING LOCKING FUNCTION

FIELD

Figure 1:
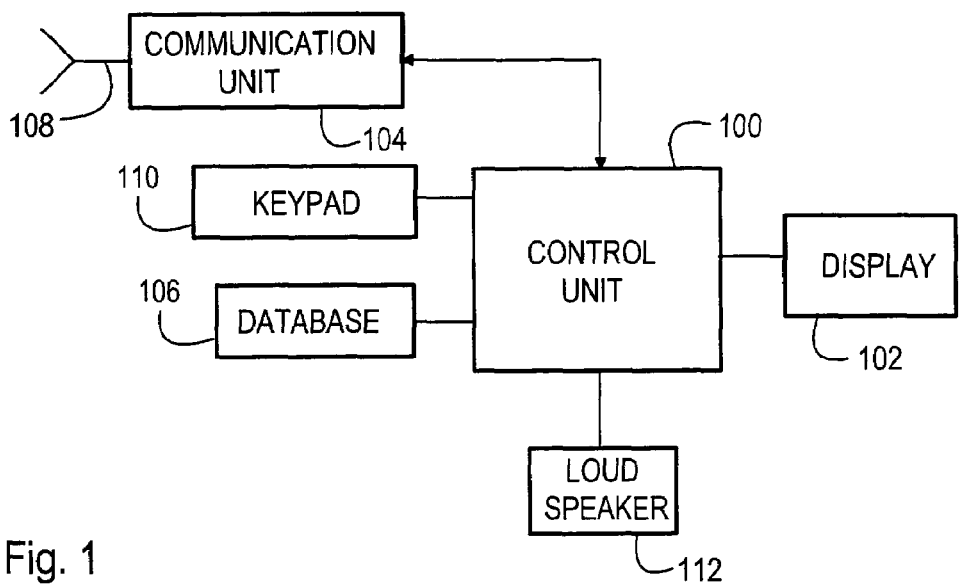

The invention relates to a method and an arrangement for controlling a locking function in targets whose operation is restricted by a locking mechanism.

BACKGROUND

It is known to use a device lock state, such as a screensaver state, in electronic devices, such as mobile stations and PDA (Personal Digital Assistant) devices, to prevent the operation of the device when it is subjected to unintentional keystrokes for instance during transport or inadvertently by the user. The device lock state can be activated for instance by depressing a given key or given keys on the keypad or by selecting said function by the menus of the device. It is also common that, when not used for a given period of time, the device automatically enters the lock state. A special password can be taken into use to prevent unauthorized use of the device, and the user has to input it by means of the keypad, for example, to deactivate the lock state. Separate keys or key cards, for example, for opening locks are also required for access to locked premises, such as homes or offices. For security reasons, it is increasingly more common to lock doors and gates to backyards, residential areas or office buildings.

The drawback in prior art solutions is the difficulty to remember special passwords. If, again, no password is required to deactivate a lock state, the device may be subjected to unauthorized use or be activated by mistake during transport, for example. Passwords may also be mislaid, causing significant economic damage to the user of the device. The use of electronic key codes is also inconvenient. It is difficult to remember key codes and their activation requires special measures. The keys may also easily be mislaid, in which case the locks would have to be changed.

BRIEF DESCRIPTION

The object of the invention is to provide a method and an apparatus for implementing the method to alleviate prior art problems. This is achieved by a method of controlling a locking function in a locking arrangement. The method of the invention comprises creating a database from predetermined objects; determining at least one user-specific inter-object internal order in the database; detecting a control command for starting the control of the locking function; displaying a predetermined number of objects on the display of the locking arrangement once the control command is detected; detecting the selection order of the objects; changing the lock state when the detected object selection order is at least sufficiently close to a given user-specific inter-object internal order.

The invention also relates to an arrangement for controlling a locking function. The arrangement of the invention comprises means for: creating a database from predetermined objects; determining at least one user-specific inter-object internal order in the database; detecting a control command for starting the control of the locking function; displaying a predetermined number of objects on the display of the arrangement once the control command is detected; detecting the selection order of the objects; changing the lock state when the detected object selection order is at least sufficiently close to a given user-specific inter-object internal order.

The preferred embodiments of the invention are described in the dependent claims.

The method and arrangement of the invention provide a plurality of advantages. Access to locked destinations or devices is facilitated without any risk to security. No special passwords or codes have to be remembered to control the locking function. An advantage of the invention is that even an authorized user of the system does not necessarily know any exactly correct code to deactivate the locking. The solution of the invention provides an easy-to-use and safe way to control the locking function.

LIST OF THE FIGURES

Figure 2:
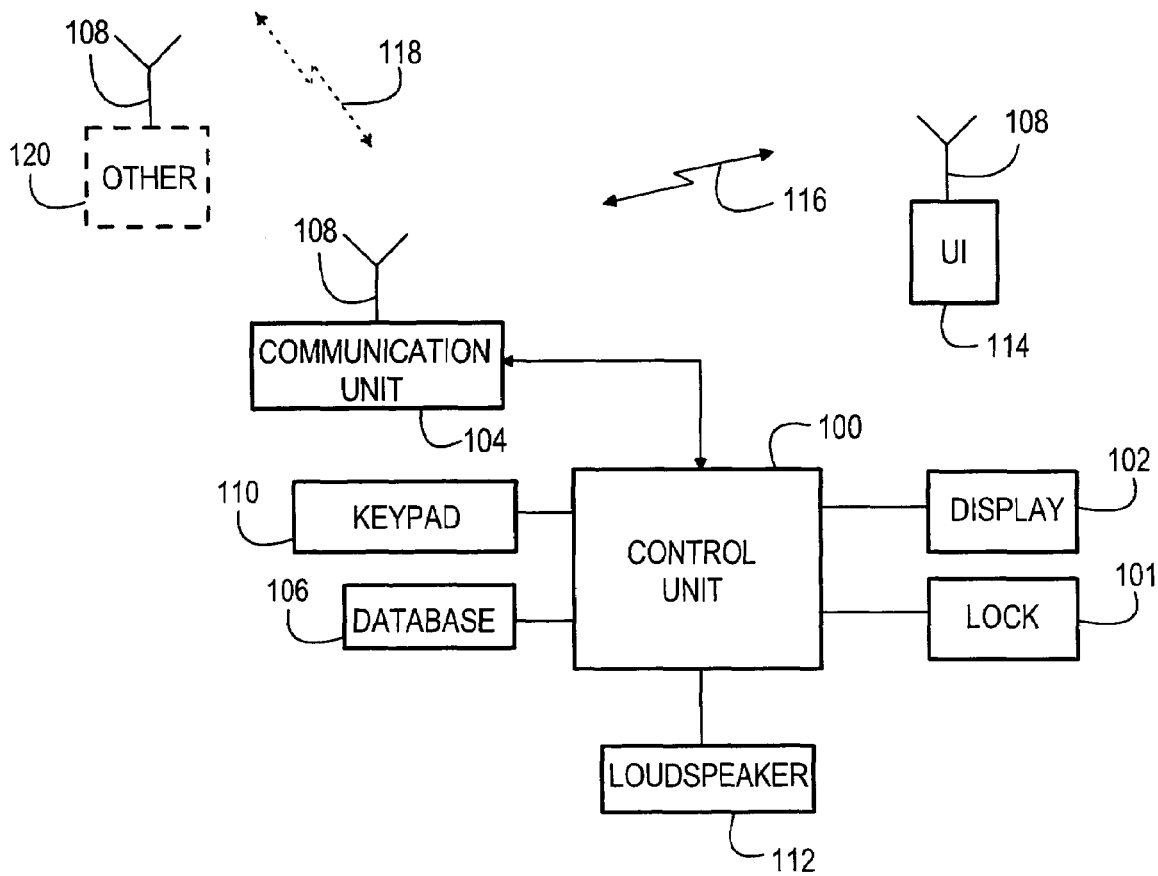
Figure 3:
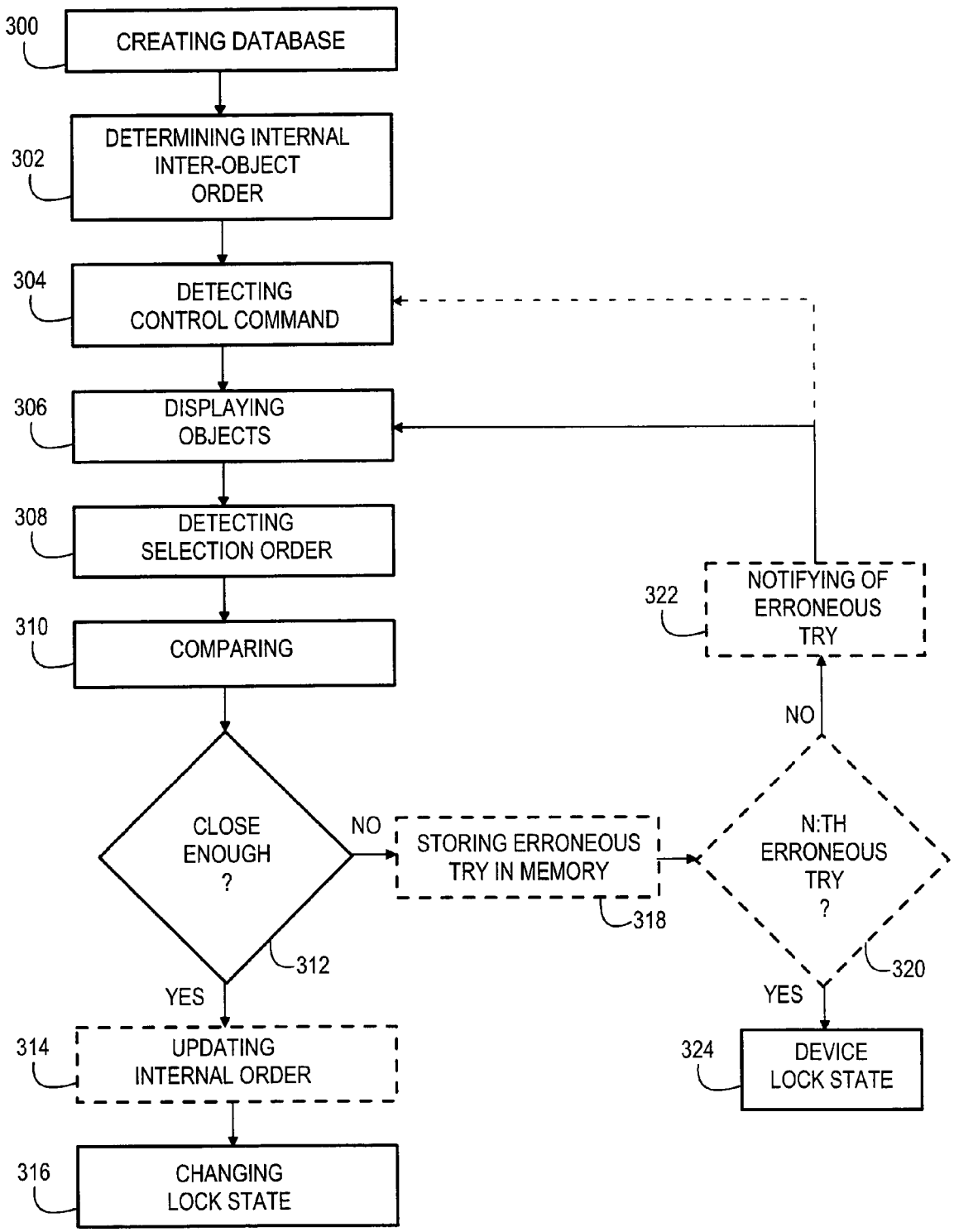
Figure 4:
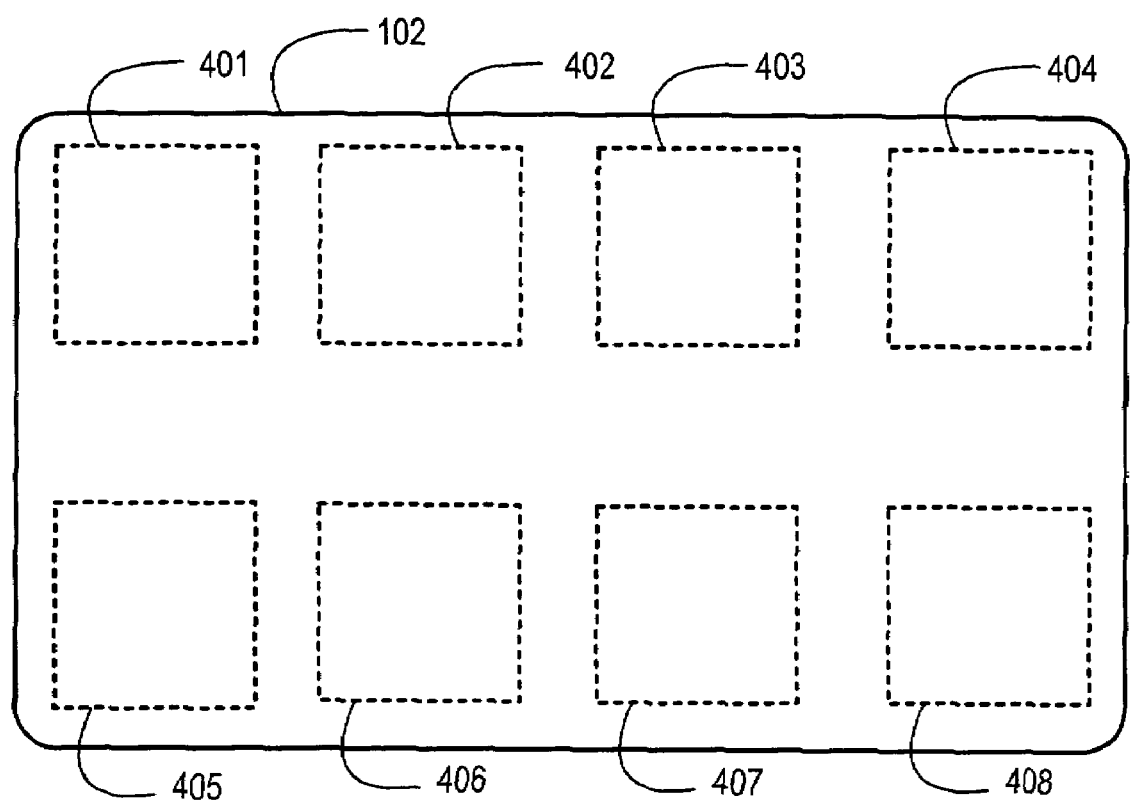

In the following, the invention will be described in greater detail in connection with preferred embodiments with reference to the accompanying drawings, in which FIG. 1 shows a device of the invention, FIG. 2 shows an arrangement of an embodiment of the invention, FIG. 3 is a block diagram of an embodiment of the invention, FIG. 4 shows a method of the invention.

DESCRIPTION OF THE EMBODIMENTS

The embodiments of the invention are applicable for instance in portable electronic devices, such as a mobile station used as a terminal in telecommunication systems comprising one or more base stations and terminals communicating with the base stations. In some embodiments of the invention, the device includes means for short-range communication implemented by means of a Bluetooth chip, an infrared or WLAN connection, for example. The portable electronic device is for instance a mobile station or another device including telecommunication means, such as a portable computer, a handheld computer or a smart phone. The electronic device may also be a PDA (Personal Digital Assistant) device comprising telecommunication means for establishing a network connection or a PDA device connectable for instance to a mobile station for a network connection. The portable electronic device may also be a computer or PDA device not including telecommunication means.

FIG. 1 is a block diagram of the structure of a portable electronic device, such as a mobile station. The basic functions of the device are controlled by a control unit 100, which is typically implemented by means of a microprocessor and software or separate components. The user interface of the device comprises a display 102 and a keypad 110. Alternatively, the user interface of the device only includes the keypad 110 or the display 102, but not both. The display 102 is for instance a touch screen, and the user of the device gives commands to the device by touching objects visible on the touch screen. The display 102 is typically a liquid crystal display. Depending on the type of device, there may be different and a different number of user interface parts. The device in FIG. 1, such as a mobile station, includes conventional means for implementing the functions of a mobile station and including speech and channel coders, modulators and RF parts. The device also comprises a communication unit 104, an antenna 108 and a loudspeaker 112.

In a preferred embodiment of the invention, a database 106 is created from predetermined objects. An object may be one or more letters, digits, figures, images, songs or a combination thereof including two or more objects. The device may include a database 106 or several databases including objects. The database 106 may also be created by retrieving objects via a communications connection, for example from the Internet, established by means of the communication unit 104. The database 106 comprises the desired number of objects, for instance a hundred or thousand images.

Next, the user-specific inter-object internal order in the database 106 is determined, controlled by the control unit 100. This is accomplished for instance by displaying, on the display 102 of the device, the objects included in the database 106, which the user places in the desired order for instance by means of the keypad 110. Such an inter-object internal order is for instance the order of superiority of the objects as specified by the user. The device may also have several authorized users, each user having a special user-specific inter-object internal order determined for instance in the database 106 or somewhere else in the memory of the device. The user-specific inter-object internal order is determined in the user profiles of the device, for example.

Next, when the lock state of the device is to be controlled, for instance activate or deactivate the device lock, the user gives a control command for controlling the locking function for instance by depressing a key or keys of the keypad 110. The control unit 100 of the device detects the control command as the start of the control of the locking function, whereby, controlled by the control unit 100, a predetermined number of objects are retrieved from the database 106 and the objects are displayed on the display 102. The objects to be displayed on the display 102 are selected from the database 106 randomly, for example. The user of the device next selects the objects visible on the display 102 in a given order by means of the keypad 110 or the touch screen, for example. The control unit 100 detects the object selection order, whereupon, controlled by the control unit 100, the detected object selection order is compared with the determined user-specific inter-object internal order.

Once the detected object selection order is at least sufficiently close to a given user-specific inter-object internal order, the device lock state is changed; the lock state is activated or deactivated, for example. Thus, the detected object selection order does not necessarily have to be exactly the same as the determined user-specific inter-object internal order. If the database 106 includes for instance a large number of objects, a larger deviation in the selection order as compared with the user-specific inter-object internal order can be specified as sufficient for instance for deactivating the device lock. If the device has several users, each of which has a user-specific inter-object internal order determined in the memory of the device, the user-specific inter-object internal order of each user may be detected based on the detected control command. For example, a different control command to start the control of the locking function may exist for each user, based on which each user is identified.

In an embodiment of the invention, a signal is given once the selection of one or more objects is detected, for example. Such a signal may be a light, sound and/or vibration signal, for example. The objects visible on the display 102 may also be displayed illuminated after the detection of their selection, for example.

The embodiments of the invention are also applicable in locking arrangements that control the access to locked destinations, such as buildings. FIG. 2 shows an arrangement, in which the preferred embodiments are applicable. The arrangement of FIG. 2 includes a control unit 100 for controlling a lock mechanism 101, such as the lock of a door or gate. The arrangement also includes a communication unit 104 for receiving and transmitting signals and establishing short-range connections, such as Bluetooth or infrared connections and remote connections, such as the Internet and GPRS (General Packet Radio Service) between the control unit 100 and the devices communicating with it. The control unit 100 is typically implemented by means of a microprocessor and software or separate components. The control unit 100 is linked to the lock mechanism 101 for instance by an electric or mechanical connection or a wireless data link. The arrangement of FIG. 2 also includes a transceiver 114, which is in a bi-directional connection 116 with the other parts of the locking arrangement. The arrangement further includes a display 102, a loudspeaker 112, a database 106, a keypad 110 and antennas 108. The parts of the arrangement may be physically separate or located in the same device. Between the parts is for instance either a mechanical or wireless connection and, together, the parts form a functional entity, whose operation is controlled by the control unit 100.

In the embodiment of the invention shown in FIG. 2, a database 106 is also formed from predetermined objects. In the example of FIG. 2, the database 106 is in association with the lock mechanism 101 controlled by the control unit 100. The database 106 may also be a unit communicating with the rest of the system via a separate data link, such as an Internet connection. In FIG. 2, the parts: another unit 120 and a data link 118, shown by dashed lines, denote such an alternative. In the embodiment of FIG. 2, a user-specific inter-object internal order is also determined.

In the arrangement of FIG. 2, a short-range wireless connection, such as a Bluetooth connection, is established between the transceiver 114 and the communication unit 104. The control command for starting the control of the locking function is detected via the short-range wireless connection established. In practice, the transceiver 114 is for instance the mobile station of a user requesting access. The control unit 100 identifies a given user based on a signal transmitted by the transceiver 114. The control unit 100 is thus able to associate said transceiver 114 with a given predetermined user-specific inter-object order of the user. It is also feasible that the user gives the control command for initiating the control of the locking function directly by means of the keypad 110 or the display 102, for example.

Next, a predetermined number of randomly selected objects included in the database 106 are displayed on the display 102. The objects are selected for instance in the transceiver 114 by means of the short-range wireless connection 116. The objects may also be selected by means of the keypad 110 or the display 102. The control unit 100 detects the object selection order and compares it with a given user-specific inter-object internal order in its memory. If the object selection order detected is at least sufficiently close to a given user-specific inter-object internal order, the lock of the lock mechanism 101 is deactivated or activated, controlled by the control unit 100. If the database 106 is in the other unit 120 across a data link 118, for example, the comparison may be performed in said other unit 120, the result of the comparison being returned via the data link 118 to the control unit 100. Different parameters, for example, can be used to determine if the detected object selection order is sufficiently close to a given user-specific inter-object internal order. A selection that is closer to a determined user-specific inter-object internal order may be required from the user for access to destinations requiring special protection than is required for access to less important destinations, for example.

The arrangement of FIG. 2 may include several transceivers 114 such that each user authorized to control the lock mechanism 101 controls the operation of the lock mechanism 101 by means of his transceiver 114. Thus the users of the system do not have to carry along separate keys. For example, for access to a locked building, only a mobile phone is needed.

The control unit 100 may also control the operation of several lock mechanisms 101 such that after the detection of an accepted object selection order, the locks of several doors of a building are opened, for example.

In a preferred embodiment of the invention, the control command for starting the control of the locking function is interpreted as detected when the control unit 100 detects the signal of any nearby transceiver 114, 120. A predetermined number of objects are then transmitted, controlled by the control unit 100, to the display of said transceiver 114, 120, of which the authorized user selects objects in a given order. Once the objects are selected, the user sends the selected object selection order back to the control unit 100 and includes therein a personal identifier, such as a digital signature. A digital signature is a character string formed by cryptographic methods known per se such that the identity of the transmitter and the integrity of the material transmitted are guaranteed. The predetermined user-specific inter-object internal order corresponding to said identifier transmitted by the user is then searched for, controlled by the control unit 100, and the received object selection order is compared with said inter-object internal order. If the detected object selection order is at least sufficiently close to said user's user-specific inter-object internal order, the lock of the lock mechanism 101 is next deactivated.

In an embodiment of the invention, an alarm can be given for instance by means of the loudspeaker 112 of the system, when the detected object selection order is not sufficiently close to a given user-specific inter-object internal order. An alternative is to send a message directly to a security company or the police as a result of the detection of erroneous tries. In this case, the arrangement simultaneously operates as a burglar alarm.

Let us study an embodiment of the invention by means of the block diagram of FIG. 3. FIG. 3 shows the alternative embodiments of the method by the steps and arrows outlined with dashed lines. At first, in step 300, a database is created from predetermined objects, such as images known to a user. The objects in the database can be retrieved for instance via an Internet connection. Ready-made object databases can also be used, from which the user selects the desired ones. In step 302, the user-specific inter-object internal order in the database is determined. The inter-object internal order is determined for instance by displaying a list on the display of the device showing the objects in the database and each user selecting the objects in the list in a given, desired order.

In step 304, the control command for starting the control of the locking function is detected. The control command for starting the control of the locking function is detected for instance based on the depression of one or more keys on a keypad or a touch on one or more contact areas on a touch screen. A connection set-up request transmitted via a short-range connection from a separate transceiver may also be interpreted as a control command. If the system has several users, each user may be identified for instance based on the detected control command.

In step 306, a predetermined number of objects, randomly retrieved from the database, are displayed on the display. The objects may be displayed on the display in the form of a list or matrix, for example. In step 308, the object selection order is detected by means of a touch screen or keypad, for example. It is also feasible that at first for instance six objects are displayed on the display and once their selection order is detected, another six objects, for instance, are displayed on the display. The number of objects to be displayed and the manner in which they are displayed may be predetermined.

In step 310, the detected object selection order is compared with a predetermined user-specific inter-object internal order. In step 312, a check is made to see if the result of the comparison is sufficiently good, i.e. if the detected object selection order is at least sufficiently close to the given user-specific inter-object internal order. Thus, the object selection order does not have to be exactly the same as the determined user-specific inter-object internal order. Slight deviations between the selection order and the determined internal order may be qualified as accepted. If the object selection order is not sufficiently close to the determined internal order, partial access to the desired device or destination may be still permitted. This means that an unauthorized user may for instance make an emergency call or gain access to certain premises of the locked destination. However, if the detected object selection order is at least sufficiently close to the user-specific inter-object internal order, the process proceeds to step 316, where the lock is activated or deactivated.

In an embodiment of the invention, a user-specific inter-object internal order may also be changed for instance when the object selection order is sufficiently close to a given user-specific inter-object internal order. In step 314, the user-specific inter-object internal order is changed for instance such that the new updated internal order is the same as the selection order. The internal order may also be updated such that only the order of objects that are close to one another in the internal order is changed when the order of said objects in the selection order was different from that determined in the internal order. Learning algorithms and/or intelligent networks known per se can also be used in changing the internal order.

In an embodiment of the invention, if the object selection order detected in step 312 is not sufficiently close to the user-specific inter-object internal order, the process proceeds to step 318, where the number of erroneous tries is increased, i.e. the erroneous tries are stored, e.g. in a flash memory of the arrangement or a network connected thereto. Next, in step 320, it is checked if an nth successive erroneous try was involved. Said nth number may be determined as is suitable. For example, three erroneous tries may be allowed before the lock state of the arrangement is entered in step 324. If the erroneous try detected in step 320 is for instance the first, the process returns to step 306, where a predetermined number of objects randomly retrieved from the database are displayed on the display. In other words, the user is given a new chance to try to deactivate the touch screen lock. Alternatively, the process goes from step 320 back to step 304, where the control command for starting the locking function control is detected. Before returning to step 304 or 306, in step 322, a notification about the erroneous try may be given for instance on the display or by giving a signal indicative of an erroneous try, such as a sound signal.

If it is detected in step 320 that an nth, say third, successive erroneous try is involved, the arrangement lock state is entered in step 324. The deactivation of the lock state 324 is subject to measures taken by an authorized service person, for example. Alternatively, the lock state 324 may be deactivated for instance via a service obtained via the Internet service. Also when a user does not for one reason or another succeed in selecting an acceptable object selection order, an authorized, reliable service provider may provide help, for instance via the Internet or the telephone network.

Let us next study an example of the method of the invention by means of FIG. 4, particularly from a user's point of view. FIG. 4 shows a display 102, such as a touch screen, used as the user interface part of a lock system. Areas 401 to 408 denoted by broken lines in FIG. 4 are predetermined objects 401 to 408, the user-specific internal order between which is specified in a database created from the objects 401 to 408. The objects 401 to 408 are images, for example. The database may include for instance pictures of motorcycles and automobiles. If the user prefers for instance automobiles to motorcycles, all automobile pictures are in an internal order before the motorcycles. The automobile pictures are also in a mutual internal order for instance such that all sports cars are in an internal order before family cars. Thus the user determines the inter-object internal order based on his preferences, for example. Several parameters may also be determined for the inter-object internal order for example by placing objects that have a special significance to the user before the other corresponding ones in the internal order. If for instance an image object depicts a family car of a given make that the user has owned, said object also precedes the objects depicting sports cars. If desired, the user may add objects to the created database by placing the objects to be added in desired points in the existing database.

When the user wants to deactivate or activate the locking of the locking arrangement, he first gives a control command for starting the control of the locking function. The control command is given for instance by means of the display 102, the keypad or a portable transceiver. Once the control command is detected, objects 401 to 408, randomly selected from the database, are displayed on the display 102. The user next selects the objects 401 to 408 visible on the display 102 in a given order. Based on the predetermined inter-object internal order, the user has at least some kind of idea of the internal order between the objects 401 to 408 visible on the display 102. The user selects the objects 401 to 408 for instance directly by touching the display 102 or for instance by means of the keypad.

It is also feasible that only a predetermined number, e.g. four, of the objects 401 to 408 displayed on the display 102 are selected in a given order. If the predetermined user-specific inter-object 401 to 408 internal order of the objects 401 to 408 displayed on the display 102 is for example: 401, 402, 403, 404, 405, 406, 407, 408, the four objects selected by the user are for example: 401, 404, 406, 407. It is also feasible that only the first four objects 401 to 404 from a predetermined user-specific inter-object internal order: 401, 402, 403, 404, 405, 406, 407, 408 displayed on the display 102 have to be selected, for example. If in the above cases the user selects more than four objects, for instance all eight objects 401 to 408 displayed, and even if the selected objects were in the right order compared with the predetermined inter-object internal order, the selection is incorrect.

For the objects 401 to 408 displayed on the display 102, the predetermined user-specific inter-object internal order is for example: 401, 402, 403, 404, 405, 406, 407, 408. The user selects the objects 401 to 408 for example in the selection order: 401, 402, 404, 403, 405, 408, 406, 407. Although the object selection order selected by the user, 401, 402, 404, 403, 405, 408, 406, 407, differs slightly from the inter-object internal order, the system lock can, however, be deactivated or activated. This is because the detected object 401 to 408 selection order is sufficiently close to the user-specific inter-object internal order. If the object selection order selected by the user is for example: 408, 403, 402, 406, 405, 407, 401, 404, said selection order is not very close to the predetermined user-specific inter-object internal order. In this case, the deactivation or activation of the lock is not accepted and a message indicative of an erroneous try is displayed on the display 102, for example.

The predetermined user-specific inter-object internal order can be changed when necessary and always for instance when the object 401 to 408 selection order selected by the user slightly deviates from the internal order. If the object selection order is for instance the above described: 401, 402, 404, 403, 405, 407, 406, 408, the new changed user-specific internal order is for example: 401, 402, 404, 403, 405, 406, 408, 407. When changing the user-specific inter-object internal order, for instance adaptation processes are used, as a result of which the internal order adapts to the selection orders detected by the system. The degree to which the internal order is changed after each detection of a selection order deviating from each internal order can be determined for example in the settings of the arrangement using the method.

Although the invention is described above with reference to the example according to the accompanying drawings, it is apparent that the invention is not limited thereto, but can be modified in a variety of ways within the scope of the attached claims.

The invention claimed is:

1. A method comprising:
   creating a database from predetermined objects;
   determining at least one user-specific inter-object internal order of the predetermined objects in the database;
   detecting a control command for starting control of a locking function;
   displaying a random subset of the predetermined objects on a display of a locking arrangement once the control command is detected;
   detecting the selection order of the displayed predetermined objects; and
   changing the lock state when the detected selection order differs, by a predetermined parameter, from a determined user-specific inter-object internal order.

2. A method as claimed in claim 1, the method further comprising displaying the random subset of predetermined objects in a random order on the display.

3. A method as claimed in claim 1, the method further comprising identifying the determined user-specific inter-object internal order based on the detected control command.

4. A method as claimed in claim 1, wherein the predetermined objects are one or more letters, digits, figures, images, songs or a combination thereof including two or more of said types of objects.

5. A method as claimed in claim 1, the method further comprising changing the determined user-specific inter-object internal order when the detected selection order is within the predetermined parameter of the determined user-specific inter-object internal order.

6. A method as claimed in claim 5, the method further comprising using learning algorithms and/or intelligent networks in changing the determined user-specific inter-object internal order.

7. A method as claimed in claim 1, the method further comprising entering an arrangement lock state when a predetermined number of such successive selection orders are detected, wherein the selection orders are not within the predetermined parameter of the determined user-specific inter-object internal order.

8. A method as claimed in claim 1, the method further comprising establishing a short-range wireless connection and detecting the control command for starting the control of the locking function via the short-range wireless connection.

9. A method as claimed in claim 1, the method further comprising establishing a short-range wireless connection and detecting the object selection order via the short-range wireless connection.

10. A method as claimed in claim 1, the method further comprising determining the user-specific inter-object internal order in one or more user profiles of the arrangement.

11. An arrangement comprising:
  means for creating a database from predetermined objects;
  means for determining at least one user-specific inter-object internal order of the predetermined objects in the database;
  means for detecting a control command for starting control of a locking function;
  a display for displaying a random subset of the predetermined objects once the control command is detected;
  a user interface for detecting the selection order of the objects; and
  means for changing the lock state when the detected selection order differs, by a predetermined parameter, from a determined user-specific inter-object internal order.

12. An arrangement as claimed in claim 11, wherein the arrangement comprises a transceiver unit configured to establish a communications connection, transmit a control command for starting the control of the locking function and transmit the selection order.

13. An arrangement as claimed in claim 12, wherein the communications connection is a short-range wireless connection.

14. An arrangement as claimed in claim 11, wherein the arrangement comprises means for displaying the random subset of predetermined objects in a random order on the display.

15. An arrangement as claimed in claim 11, wherein the arrangement comprises means for identifying the determined user-specific inter-object internal order based on the detected control command.

16. An arrangement as claimed in claim 11, wherein the arrangement comprises means for changing the inter-object internal order when the selection order is within a predetermined parameter of the determined user-specific inter-object internal order.

17. An arrangement as claimed in claim 16, wherein the arrangement comprises means for using learning algorithms and/or intelligent networks in changing the determined user-specific inter-object internal order.

18. An arrangement as claimed in claim 11, wherein the arrangement comprises means for entering an arrangement lock state when a predetermined number of such successive selection orders are detected, wherein the selection orders are not within the predetermined parameter of the determined user-specific inter-object internal order.

19. An arrangement as claimed in claim 11, wherein the arrangement comprises means for establishing a short-range wireless connection and detecting the control command as the start for controlling the locking function via the short-range wireless connection.

20. An arrangement as claimed in claim 11, wherein the arrangement comprises means for determining the user-specific inter-object internal order in one or more user profiles.

21. An arrangement as claimed in claim 11, wherein the arrangement is in a portable electronic device.

22. An arrangement as claimed in claim 11, wherein the arrangement is in a door or gate.

23. A method comprising:
  storing a database of predetermined objects in a first device;
  determining at least one user-specific inter-object internal order of the predetermined objects in the database;
  detecting a control command by the first device for starting control of a locking function by detecting a signal from a second device;
  in response to detecting the control command, transmitting a random subset of the predetermined objects to the second device;
  displaying the transmitted random subset of predetermined objects on a display of the second device;
  detecting a selection order of the displayed predetermined objects;
  transmitting the selection order and an identifier of the second device to the first device; and
  changing the lock state when the detected selection order differs, by a predetermined parameter, from a determined user-specific inter-object internal order associated with the identifier.

24. The method of claim 23, wherein the identifier is a digital signature.

25. The method as claimed in claim 23, wherein the first and second devices communicate via a short-range wireless connection.

* * * * *